United States Patent [19]

Mezger et al.

[11] Patent Number: 4,606,303

[45] Date of Patent: Aug. 19, 1986

[54] RECIPROCATING PISTON INTERNAL COMBUSTION ENGINE

[75] Inventors: Hans Mezger, Freiberg; Walter Wurster, Weissach-Flacht, both of Fed. Rep. of Germany

[73] Assignee: Dr. Ing. h.c.F. Porsche AG, Fed. Rep. of Germany

[21] Appl. No.: 623,927

[22] Filed: Jun. 25, 1984

[30] Foreign Application Priority Data

Jun. 23, 1983 [DE] Fed. Rep. of Germany ....... 3322544

[51] Int. Cl.⁴ ............................................. F02B 25/08
[52] U.S. Cl. .............................. 123/51 BD; 123/52 B;
123/315; 123/432; 123/663; 92/177
[58] Field of Search .............. 123/51 BD, 52 B, 65 A,
123/308, 315, 659, 302, 432, 663, 666, 667, 193
H, 266, 657; 92/177

[56] References Cited

U.S. PATENT DOCUMENTS

| 2,164,234 | 6/1939 | Erren | 123/65 A |
|---|---|---|---|
| 4,267,811 | 5/1981 | Springer | 123/193 H |
| 4,271,801 | 6/1981 | Yamakawa et al. | 123/308 |
| 4,321,893 | 3/1982 | Yamamoto | 123/65 A |
| 4,401,067 | 8/1983 | Honda | 123/193 H |
| 4,471,730 | 9/1984 | Honda | 123/315 |
| 4,484,550 | 11/1984 | Gadefelt et al. | 123/308 |

FOREIGN PATENT DOCUMENTS

| 629614 | 12/1961 | Italy | 123/193 H |
|---|---|---|---|
| 467320 | 6/1936 | United Kingdom | 123/315 |
| 1212692 | 11/1970 | United Kingdom | 123/315 |

Primary Examiner—Craig R. Feinberg
Assistant Examiner—David A. Okonsky
Attorney, Agent, or Firm—Craig & Burns

[57] ABSTRACT

In a reciprocating piston internal combustion engine, an upwardly arcuately shaped combustion space is formed in the cylinder head, which contains suspended valves arranged V-shaped. The valves are moved as close as possible to the combustion space boundary and form narrow spaces with respect thereto. The radii of the transitional arcs from the valve-end faces to the combustion space boundary increase continuously from the narrow spaces in both circumferential directions of the combustion space boundary and reach their maximum values in the center plane between the valves. The combustion space curvature is matched to the predetermined angles of inclination of the valves.

16 Claims, 7 Drawing Figures

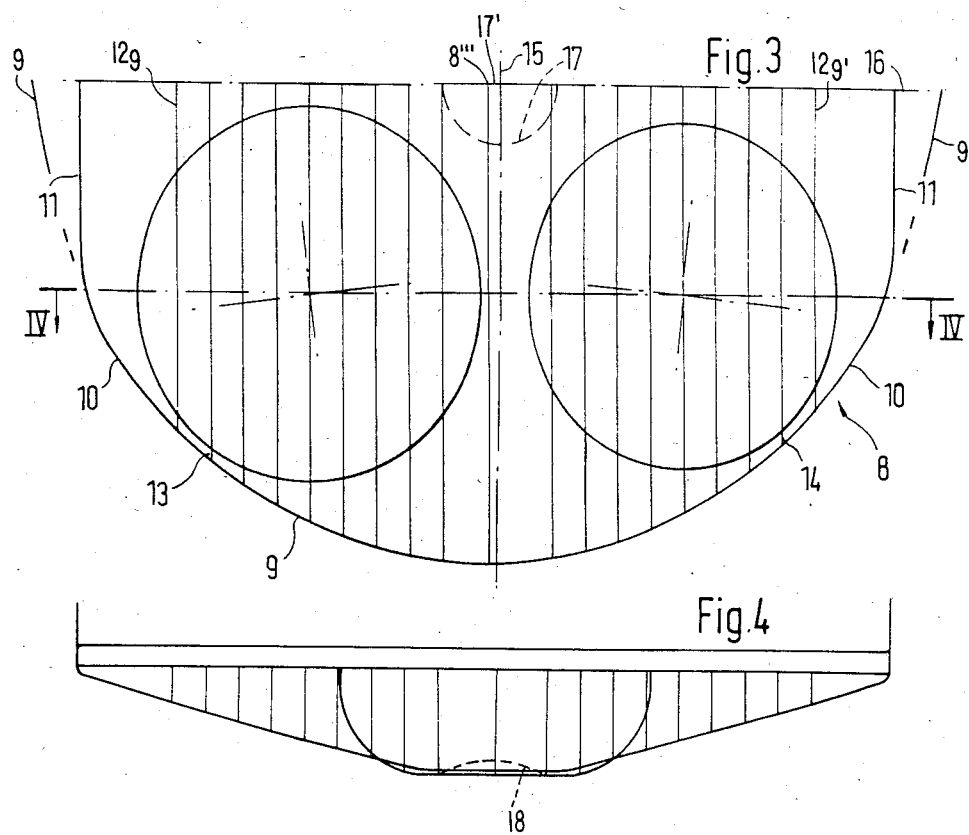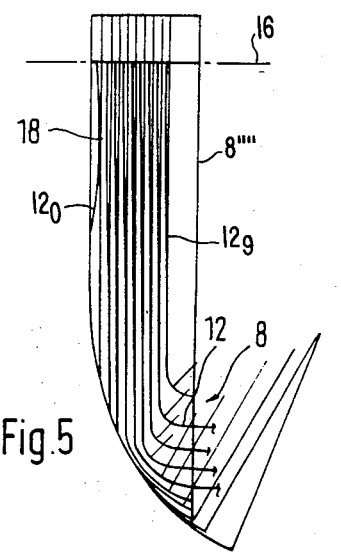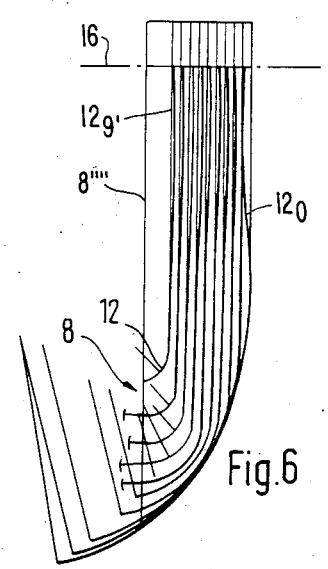

RECIPROCATING PISTON INTERNAL COMBUSTION ENGINE

The present invention relates to a mixture-compression reciprocating-piston internal combustion engine externally controlled by means of a spark plug and with valves arranged suspended and inclined to the cylinder axis.

In such a type of internal combustion engine, as disclosed in the Gernam Offenlegungsschrift No. 20 12 632, each half of the combustion space formed in the cylinder head consists of two arched recesses disposed symmetrically to the cylinder axis, whose walls are formed by partially spherical surfaces. One exhaust valve and one inlet valve each are coordinated to each recess. The two recesses are subdivided by a ridge, in order to realize the formation of two vortices without the use of squeeze surfaces and to achieve thereby a good thorough-vortexing or swirling and optimum combustion of the fuel-air mixture. However, this ridge is disadvantageous from a thermal point of view. For it reaches a higher temperature than the remaining combustion space walls and can therefore be the starting point of knock appearances so that such a combustion space does not permit a high compression ratio. Additionally, the ridge prevents the flow vortices or swirls from crossing over and forming an overall flow engulfing the entire combustion space, which is necessary if one seeks to remove the exhaust gas residues out of the combustion space as completely as possible after the compression stroke in order to fill the same completely with a freshly sucked-in mixture. This aspect is a primary consideration in particular with four-valve internal combustion engines which have to accept higher manufacturing costs for reasons of improved filling.

Accordingly, it is the principal object of the present invention to so construct the combustion space of a reciprocating piston internal combustion engine that a good filling with fuel-air mixture and a high compression ratio are made possible.

In order to further improve the inflow and exhaust-flow conditions in the combustion space, two inlet valves and two exhaust valves each are inclined to one another V-shaped in the longitudinal direction of the internal combustion engine; the curvature of the combustion space is matched to the angular position of the valves.

These and other objects, features and advantages of the present invention will become more apparent from the following description when taken in connection with the accompanying drawing which shows schematically, for purposes of illustration only, a four-valve cylinder head in accordance with the present invention, and wherein:

FIG. 3 is a bottom plan view of a combustion space half;

FIG. 4 is a combustion space contour in the cross center plane IV—IV of FIG. 3 through the inlet and exhaust valve;

FIG. 5 represents the combustion space transitional arcs for the inlet valves in the planes of the left combustion space half of FIG. 3; and FIG. 6 represents the combustion space-transitional arcs for the exhaust valve in the planes of the right combustion space half of FIG. 3.

Figure 2:
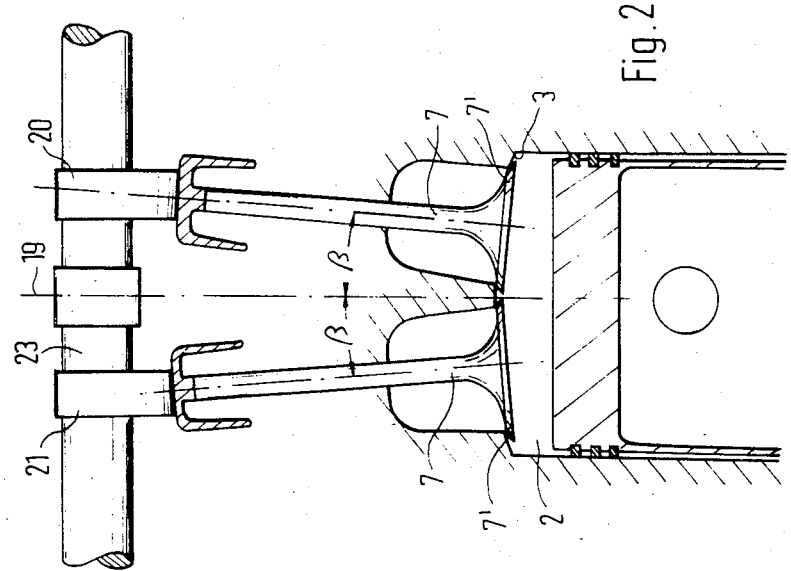
FIG. 2 is a longitudinal cross-sectional view taken along line II—II of FIG. 1.
Figure 1:
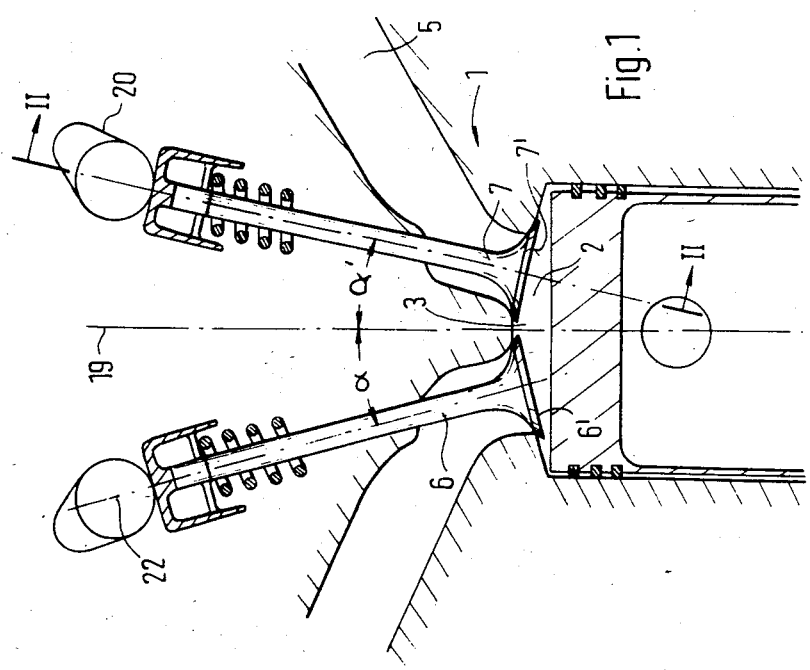
FIG. 1 is a cross-sectional view through a cylinder head in accordance with the present invention.

Referring now to the drawings wherein like reference numerals are used throughout the various views to designate like parts, an upwardly arcuately shaped combustion space 2 is formed in the cylinder head generally designated by reference numeral 1 of an internal combustion engine, whereby two inlet channels or ducts 4 and two exhaust channels or ducts 5 terminate in the arched combustion space wall 3, which are controlled by two inlet valves 6 and two exhaust valves 7. Each combustion space half 2' includes an inlet valve 6 and a smaller exhaust valve 7 which are disposed roof-shaped to the combustion space 2 in their transverse center plane IV—IV. The arcuate curvature of the combustion space 2 is so constructed that at each location transitional arcs with maximally large radii lead from the end-faces of the inlet valves 6 and exhaust valves 7, respectively, from the valve seating rings thereof to the combustion space boundary 8. Each half of the combustion space boundary 8 is composed of a larger circular arc 9, which also represents the cylinder walls having a cylinder axis 8''', of two smaller circular arcs 10 adjoining the larger arc on both sides thereof and of two straight or approximately straight lines 11 parallel to one another and tangential to the smaller arcs.

The combustion space 2 of the cylinder head of FIG. 3 is separated from the cylinder proper by parting plane '''' as shown in FIGS. 5 and 6, the parting plane 8'''' serving as termination for transitional arcs 12.

As can be seen from FIGS. 3, 5 and 6, the radii of the transitional arcs 12 are smallest at the narrow spaces 13 and 14 which the valves 6 and 7 form with respect to the combustion space boundary 8, then become continuously larger in both circumferential directions of the combustion space boundary 8 and reach their maximum values in the two center planes 15 and 16 disposed perpendicular to one another between the valves 6 and 7.

It will be observed that center plane 15 is offset from the cylinder axis 8''' by a finite distance 8'''-17'. The parallel planes are placed in FIG. 3 through the combustion space within the area of the inlet valve 6 and the exhaust valve 7. These planes are indicated in FIGS. 5 and 6 intersecting the transitional arcs 12 starting from the combustion space boundary 8. The planes corresponding to the transitional arcs 12 are shown in FIG. 3, beginning at the center plane 15 passing through the axis 17' of the spark plug 17, the center plane being shown in FIGS. 5 and 6 respectively at $12_0$. The planes as shown in FIG. 3 are positioned progressively outwardly to the left to a plane $12_9$ shown in FIG. 5 and to the right to a plane $12_{9'}$ shown in FIG. 6. The more such planes are placed through the combustion space, the better the arcuate configuration thereof can be approximately purely constructively to the ideal shape of a stepless enlargement of the radii of the transitional arcs. As shown in FIGS. 5 and 6, line 16' is an artificial or construction line for showing the intersection to which the transitional arcs 12 connect.

The spark plug shown in circular dashed lines 17 is arranged on the line of intersection 17' of the two center planes 15 and 16 disposed perpendicular to one another in a raised portion 18 projecting into the combustion space wall 3 and is rounded off with a large radius of curvature as shown in dashed lines in FIG. 4.

The end-faces of the inlet valves 6 and exhaust valves 7 adjoin the combustion space wall without steps or edges. For that purpose, the inlet valve and exhaust valve of each combustion space half 2 are inclined V-shaped to one another, and their angle of inclination to the cylinder axis 19 can be determined from the following equation:

$$\tangent \alpha = (4 \cdot (s/D) \cdot f/\epsilon - 1)$$

where s/D = the ratio of piston stroke to cylinder bore
f = combustion space volume of the cylinder head/compression volume
ε = compression volume/stroke volume = compression ratio In the embodiment illustrated in the drawings of the present invention $s/D = 0.83;$ $\epsilon = 11,$ and $D = 95$ mm.

If a value of f=0.7 is selected, then an angle of inclination α=13° will result. If, on the other hand, f=0.9 is selected, then the angle of inclination α=16.5°. Starting from this calculation result, an angle of inclination α=14° was determined for the inlet valve and an angle of inclination α'=15° for the exhaust valve.

Figure 7:
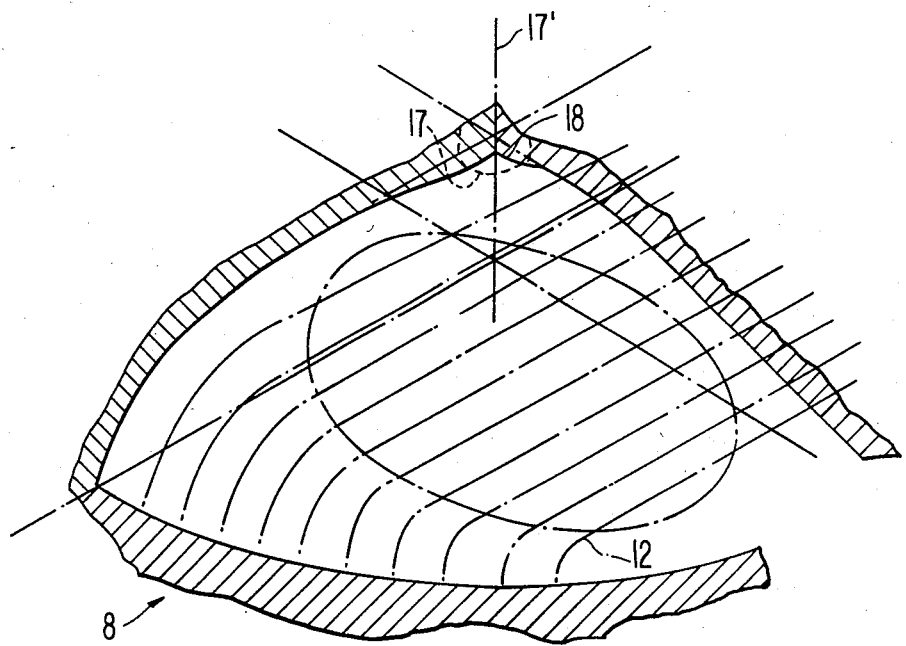
FIG. 7 represents a perspective view of the cylinder head, one quarter of which has been sectioned along two center planes.

In order to match the valve end-faces optimally to the arched configuration of the combustion space wall 3, the two inlet valves 6 and the two exhaust valves 7 are also inclined V-shaped to one another in the longitudinal direction of the internal combustion engine. Their angle of inclination B (FIG. 2) to the cylinder axis 19 amounts to about 6°; the circumferential surfaces of the cams 20 and 21 of the cam shafts 22 and 23 are bevelled with the same angle. Since these inclined surfaces have the same angle and are disposed opposite one another, the axial forces acting on the cam shafts 22 and 23 will cancel one another during the actuation of the two inlet valves and exhaust valves. FIG. 7 shows a perspective view of the cylinder head sectioned along the two center planes 15 and 16 wherein dashed construction lines indicate the configuration of the shape of the cylinder head and also show the relative position of the valve opening.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A mixture-compression reciprocating piston internal combustion engine having at least a cylinder axis and cylinder walls and externally controlled ignition, comprising
   a cylinder head having first and second center planes orthogonally disposed with respect to each other and substantially parallel to the cylinder axis, a spark plug, suspended valve means with end faces and arranged inclined to the cylinder axis, a combustion space means having a control vertex formed in an upwardly arcuately shaped recess means of the cylinder head,
   said combustion space means being disposed substantially symmetrically to the cylinder axis and having a boundary including two circular arcs substantially oppositely disposed from each other on each side of said first center plane,
   each circular arc adjoined respectively by at least one arc of smaller radius,
   the valve means being positioned close to the combustion space boundary and forming narrow spaces with the same,
   the combustion space further defined by transitional arcs, which extend to the cylinder walls, parallel to said first center plane and extending from the boundary to the valve end faces and to said second center plane,
   the radius of each transitional arc to a predetermined point thereof being greater than a corresponding radius of the contiguous transitional arc more remote from the first center plane at a point thereof corresponding to said predetermined point.

2. An internal combustion engine according to claim 1, wherein the end faces of the valve means are disposed approximately tangentially to the transitional arcs.

3. An internal combustion engine according to claim 1, wherein the spark plug is arranged on a rounded-off raised portion projecting into the combustion space means, said raised portion mating by means of a relatively large transitional radius of curvature with curved combustion space walls dropping off to intersect the combustion space boundary.

4. An internal combustion engine according to claim 3, wherein the spark plug is arranged substantially on the line of intersection of the first and second center planes disposed substantially perpendicular to one another between the valve means.

5. An internal combustion engine according to claim 1, wherein the angle of inclination α of the valve means to the cylinder axis is determined by the following equation:

$$\tangent \alpha = (4 \cdot (s/D) \cdot f/\epsilon - 1)$$

wherein
s/D = piston stroke/cylinder bore
f = combustion space volume of the cylinder head/combustion volume
ε = compression volume/stroke volume = compression ratio.

6. An internal combustion engine according to claim 5, wherein for freely intaking internal combustion engines, f is between about 0.7 to about 0.9 while for supercharged internal combustion engines f is between about 0.6 to about 0.8 whereby in both cases the 0.7 to about 0.9 values apply for the exhaust valve means and therefore the angle of inclination α of the exhaust valve means is correspondingly maximally larger by 3° than the angle of inclination α' of the inlet valve means.

7. An internal combustion engine according to claim 1, wherein each cylinder head includes two inlet valve means and two exhaust valve means, the two inlet valve means and the two exhaust valve means being arranged inclined V-shaped to one another about a longitudinal axis which is substantially parallel to the cylinder axis of the internal combustion engine and being actuated by cam means having a correspondingly inclined surfaces.

8. An internal combustion engine according to claim 7, wherein one-half of the combustion space boundary surrounding one inlet valve means and one exhaust valve means is defined by two approximately straight lines substantially parallel to one another and each tangentially adjoining one of the smaller circular arcs.

9. An internal combustion engine according to claim 7, wherein the spark plug is arranged on a rounded-off raised portion projecting into the combustion space means, said raised portion mating by means of a relatively large transitional radius of curvature with curved combustion space walls dropping off to intersect the combustion space boundary.

10. An internal combustion engine according to claim 9, wherein the spark plug is arranged substantially on the line of intersection of the first and center planes disposed substantially perpendicular to one another between the valve means.

11. An internal combustion engine according to claim 10, wherein the end faces of the valve means are disposed approximately tangentially to the transitional arcs.

12. An internal combustion engine according to claim 11, wherein one-half of the combustion space boundary surrounding one inlet valve means and one exhaust valve means is defined by two approximately straight lines substantially parallel to one another and each tangentially adjoining one of the smaller circular arcs.

13. An internal combustion engine according to claim 12, wherein said at least approximately straight lines have a relatively very large radius of curvature.

14. An internal combustion engine according to claim 12, wherein the angle of inclination $\alpha$ of the valve means to the cylinder axis is determined by the following equation:

$$\tan \alpha = (4 \cdot (s/D) \cdot f/\epsilon - 1)$$

wherein
$s/D$ = piston stroke/cylinder bore
$f$ = combustion space volume of the cylinder head/compression volume
$\epsilon$ = compression volume/stroke volume = compression ratio.

15. An internal combustion engine according to claim 14, wherein for freely intaking internal combustion engines, f is between about 0.7 to about 0.9 while for supercharge internal combustion engines f is between about 0.6 to about 0.8 whereby in both cases the 0.7 to about 0.9 values apply for the exhaust valve means and therefore the angle of inclination $\alpha$ of the exhaust valve means is correspondingly maximally larger by 3° than the angle of inclination $\alpha'$ of the inlet valve means.

16. For an internal combustion engine having a cylinder axis, cylinder walls and a cylinder head with first and second center planes substantially orthogonally disposed with respect to each other and intersecting substantially along the cylinder axis, said cylinder head comprising
a combustion space having a central vertex and a boundary, substantially coincident with the combustion space boundary having at least two first circular arcs symmetrically disposed each on opposite sides of the first center plane and a pair of two symmetrically disposed second circular arcs smaller in radius than the first circular arcs disposed on opposite sides of the first center plane, each pair respectively joining each end of the adjacent first circular arcs, the combustion space having a surface defined by a plurality of transitional arcs which extend to the cylinder walls, lying in arc planes disposed substantially parallel with the first center plane, each arc plane spaced from an adjacent arc plane and extending to intersect the second center plane and each transitional arc extending from an intersection with the boundary plane toward the second center plane, the radius of curvature of each transitional arc at a predetermined point thereon being less than the corresponding radius of the transitional arc contiguous thereto and closer to the first center plane.

* * * * *